US012755992B2

(12) United States Patent
Braun et al.

(10) Patent No.: US 12,755,992 B2
(45) Date of Patent: Oct. 6, 2026

(54) METHOD FOR CONTROLLING A DRYING PROCESS OF A FUEL CELL SYSTEM

(71) Applicant: Robert Bosch GmbH, Stuttgart (DE)

(72) Inventors: Jochen Braun, Heimsheim (DE); Matthias Rink, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 18/560,055

(22) PCT Filed: Apr. 8, 2022

(86) PCT No.: PCT/EP2022/059480
§ 371 (c)(1),
(2) Date: Nov. 9, 2023

(87) PCT Pub. No.: WO2022/238062
PCT Pub. Date: Nov. 17, 2022

(65) Prior Publication Data
US 2024/0234759 A1 Jul. 11, 2024

(30) Foreign Application Priority Data
May 14, 2021 (DE) ..................... 10 2021 204 910.9

(51) Int. Cl.
*H01M 8/04223* (2016.01)
*H01M 8/04303* (2016.01)
(Continued)

(52) U.S. Cl.
CPC ... *H01M 8/04253* (2013.01); *H01M 8/04231* (2013.01); *H01M 8/04303* (2016.02); (Continued)

(58) Field of Classification Search
CPC ......... H01M 8/04253; H01M 8/04231; H01M 8/04303; H01M 8/0432; H01M 8/04544; (Continued)

(56) References Cited

U.S. PATENT DOCUMENTS

2003/0186093 A1 10/2003 St-Pierre et al.
2010/0003561 A1 1/2010 Matsuda et al.
(Continued)

FOREIGN PATENT DOCUMENTS

CA 2552705 C * 5/2010 ........ H01M 8/04358
CA 2998301 A1 * 3/2017 ........ H01M 8/04723
(Continued)

OTHER PUBLICATIONS

Translation of International Search Report for Application No. PCT/EP2022/059480 dated Sep. 27, 2022 (2 pages).

*Primary Examiner* — Kaity V Chandler
(74) *Attorney, Agent, or Firm* — Michael Best & Friedrich LLP

(57) ABSTRACT

The invention relates to a method for controlling a drying process of a fuel cell system (100), in particular during shutdown of the fuel cell system (100), preferably in preparation for a start, in particular a cold start, of the fuel cell system (100), said method
comprising the following steps:
- initiating a drying process of the fuel cell system (100),
- setting at least one operating parameter (i, ii, iii) in at least one functional system (1, 2, 3, 4) of the fuel cell system (100) to a constant level,
- monitoring at least one outlet temperature (TCathOut, TAnodOut) from a stack (101) of the fuel cell system (100) in at least one functional system (1, 2, 3, 4) of the fuel cell system (100),
- evaluating the at least one outlet temperature (TCathOut, TAnodOut),
- determining a termination time (tdryEnd) for ending the drying operation in accordance with the evaluation.

11 Claims, 3 Drawing Sheets

(51) Int. Cl.

| | |
|---|---|
| ***H01M 8/0432*** | (2016.01) |
| ***H01M 8/04537*** | (2016.01) |
| ***H01M 8/04701*** | (2016.01) |
| ***H01M 8/04746*** | (2016.01) |
| ***H01M 8/04858*** | (2016.01) |

(52) U.S. Cl.
CPC ..... *H01M 8/0432* (2013.01); *H01M 8/04544* (2013.01); *H01M 8/04649* (2013.01); *H01M 8/04708* (2013.01); *H01M 8/04723* (2013.01); *H01M 8/04753* (2013.01); *H01M 8/0491* (2013.01)

(58) Field of Classification Search
CPC ......... H01M 8/04649; H01M 8/04708; H01M 8/04723; H01M 8/04753; H01M 8/0491; H01M 8/04291; H01M 8/04302; H01M 8/04328; H01M 8/04335; H01M 8/04828; H01M 8/04895; Y02E 60/50
See application file for complete search history.

(56) References Cited

U.S. PATENT DOCUMENTS

| | | | | |
|---|---|---|---|---|
| 2011/0003215 | A1 * | 1/2011 | Tanaka | H01M 8/04373 429/413 |
| 2013/0034787 | A1 * | 2/2013 | Miyata | H01M 8/04798 429/429 |

FOREIGN PATENT DOCUMENTS

| | | | | | |
|---|---|---|---|---|---|
| CN | 101640279 | A | * | 2/2010 | H01M 8/04634 |
| CN | 106663828 | A | * | 5/2017 | H01M 8/04097 |
| DE | 102016201611 | A1 | | 8/2017 | |
| EP | 3174146 | A1 | | 5/2017 | |
| JP | 2004111196 | A | * | 4/2004 | H01M 8/04253 |
| JP | 2007095655 | A | * | 4/2007 | Y02E 60/50 |
| JP | 2007115581 | A | * | 5/2007 | Y02E 60/50 |
| JP | 2010003494 | A | * | 1/2010 | Y02E 60/50 |
| JP | 2010015945 | A | * | 1/2010 | H01M 8/04492 |
| JP | 2016035873 | A | | 3/2016 | |
| KR | 20040038824 | A | * | 5/2004 | H01M 8/04 |
| WO | WO-2006059776 | A2 | * | 6/2006 | H01M 8/04395 |

* cited by examiner

METHOD FOR CONTROLLING A DRYING PROCESS OF A FUEL CELL SYSTEM

BACKGROUND

The invention relates to a method for controlling a drying process of a fuel cell system, in particular during shutdown of the fuel cell system, preferably in preparation for a start, in particular a cold start, of the fuel cell system according to the disclosure. In addition, the invention relates to a corresponding control unit and a corresponding computer program product.

In vehicles, so-called fuel cell vehicles, in which the drive energy is supplied by one or more fuel cell systems, among other things, the oxidizing agent oxygen from the ambient air and hydrogen as the reducing agent or fuel are generally used to react in the fuel cell to form water (or water vapor) and thus to supply electrical power by electrochemical conversion. The fuel cell systems mostly comprise multiple fuel cells assembled into a stack. The challenge for mobile fuel cell systems is to start the system under all globally relevant conditions and when the vehicles are stationary for different lengths of time:

to functionally implement and achieve the lifetime requirements for the system.

In so-called cold starts, also known as freeze starts, the focus, among other things, is on bringing the stack out of the freezing zone (temperature >0° C.) as quickly as possible, so that water produced does not freeze at critical locations in the stack. In the event of an incorrect freeze start, both the stack can suffer massively irreversible damage and the system cannot be started, i.e. the vehicle must be brought into a "warm" environment as quickly as possible during a freeze start. Mostly, it is important how much water the stack contains before the start or at the beginning of the start. This level of water should advantageously be within a tolerance range, so that the stack, on the one hand, can still store the water produced at the start in its storage components (such as e.g. membrane, gas diffusion layer, etc.), without getting blockages due to freezing water. On the other hand, the stack should also not be completely dried so that no proton conductivity of the membrane is possible and the membrane is damaged due to excessively dry conditions. Thus, upstream states and operating modes are essential to already ensure preparatory measures for the restart, such as e.g.:

drying process of the stack during shutdown of the system, and/or

Purge process when the system is at a standstill.

The drying of the cathode path can be performed, for example, by means of an air compression system (for "blowing out" the stack) for a defined time.

SUMMARY

The present invention provides: a method for controlling a drying process of a fuel cell system, in particular during shutdown of the fuel cell system, preferably in preparation for a start, in particular a cold start or a freeze start, of the fuel cell system having the features of the disclosure. In addition, the invention provides a corresponding control unit and a corresponding computer program. Of course, features and details described in connection with the different embodiments and/or aspects of the invention also apply in connection with the other embodiments and/or aspects of the invention, and respectively vice versa, so that with respect to the disclosure, mutual reference to the individual embodiments and/or aspects of the invention is or can always be made.

According to the first aspect, the present invention provides: a method for controlling a drying process of a fuel cell system, in particular during shutdown of the fuel cell system, preferably in preparation for a start, in particular a cold start of the fuel cell system.

The method comprises the following steps:

initiating a drying process of the fuel cell system, or in other words turning on the air compression system for blowing out a cathode system (comprising a cathode path and/or a cathode space in the stack) and/or an anode system or (comprising an anode path and/or anode space in the stack) of the fuel cell system, setting at least one operating parameter in at least one functional system of the fuel cell system to a constant level or a constant value, monitoring at least one outlet temperature from a stack of the fuel cell system in at least one functional system of the fuel cell system, in particular in a cathode system and/or in an anode system of the fuel cell system, evaluating the at least one outlet temperature, in particular a gradient of the at least one outlet temperature, determining a termination time for ending the drying process in accordance with the evaluation, and, in particular, ending the drying process at the specified termination time.

The steps of the method according to the invention can be performed in the specified order or in an amended order. The steps of the method according to the invention can be carried out simultaneously, at least in part concurrently, and/or sequentially.

The fuel cell system within the meaning of the invention can preferably be used for mobile applications, for example in vehicles, in particular fuel-powered vehicles. The fuel cell system within the meaning of the invention can serve as the main energy supplier for a vehicle. At the same time, however, it is also conceivable that the fuel cell system within the meaning of the invention can be a slave drive and/or auxiliary drive of a vehicle, for example a hybrid vehicle. The fuel cell system within the meaning of the invention can also be used for stationary applications, for example in generators.

The fuel cell system within the meaning of the invention can have one or more stacks each having multiple stacked fuel cells and the associated functional systems comprising: Media systems (air or cathode system, fuel or anode system, cooling system), as well as an electrical system. Preferably, the fuel cell system within the meaning of the invention can comprise multiple modules in the form of individual stacks having multiple stacked fuel cells.

The at least one functional system within the meaning of the invention can comprise a media system (containing: an air or cathode system, a fuel or anode system and a cooling system), as well as an electrical system.

The invention proposes to optimally control the drying process of the fuel cell system and, in particular, to end it in a suitable window of time so that the following advantages can be achieved, preferably such that:

the stack is not turned off when too wet, whereby reducing or even preventing problems with a cold and/or freeze start, which can put system components at risk of degradation, damage, and/or malfunction, can be reduced or even prevented, the membrane of the stack does not become too dry, whereby the risk of degradation of the membrane, e.g. by shrinkage and/or thinning of the membrane, fuel diffusion of anode to cathode, fuel concentration increase in the cathode and/or unnecessary fuel consumption can be reduced or even prevented, the shutdown of the fuel cell system does not take too long, i.e., is time-optimized, whereby optimizing postdrive time and reducing undesirable vibrations, so-called NVH, during shutdown of the system can be achieved.

The invention idea is to control the duration of the drying process based on temperature(s) in the anode path, in particular at the stack output, and/or temperature(s) in the cathode path, in particular at the stack output.

Preferably, the invention can provide for the setting of constant stack operating conditions in the functional systems of the fuel cell system, comprising:

an air system or cathode system, a cooling system, a fuel system or anode system, and/or an electrical system.

Monitoring can in particular comprise:

The temperature(s), meaning in particular the output temperature(s), in the cathode path and/or in the anode path, can be sensed over time and can be used as function(s) or trajectory/trajectories depending on the time.

The evaluation can in particular comprise:

The temperature(s), in particular the function(s) or trajectory/trajectories of the temperature(s), in the cathode path and/or in the anode path can be evaluated with respect to the first derivative or the gradient, wherein in particular the evaluation can be outsourced at least in part or entirely to an external computing unit, e.g. a cloud.

Determining the termination time can include, in particular:

selecting a suitable duration of the current drying process in accordance with the evaluation.

In addition, the method can be refined and/or plausibilized by a combination with further criteria, such as an evaluation (of the trajectory/trajectories of an impedance and/or a voltage.

It can further be provided in a method that when setting the at least one operating parameter, at least one of the following parameters is set to a constant level or a constant value:

at least one operating parameter in a cathode system of the fuel cell system, wherein in particular the at least one operating parameter in the cathode system comprises at least one mass air flow rate, a pressure level in a cathode path, and/or a cathode inlet temperature, at least one operating parameter in a cooling system of the fuel cell system, wherein in particular the at least one operating parameter in the cooling system comprises at least one temperature of a coolant at a stack inlet and/or a temperature difference of the coolant between a stack inlet and a stack outlet, at least one operating parameter in an anode system of the fuel cell system, wherein in particular the at least one operating parameter in the anode system comprises at least one pressure level in an anode path, and/or at least one operating parameter in an electrical system of the fuel cell system, wherein in particular the at least one operating parameter in the electrical system comprises at least one electrical current and/or a current density.

In this way, conditions on and/or in the stack can be set as constant as possible, so that the output temperature(s) in the cathode path and/or in the anode path, in particular their derivatives or gradients, can be indicative of the progress of the drying process or of the residual moisture in the system. During the drying process or when blowing out the cathode system and/or anode system, moisture or water droplets are discharged in the cathode path and also in the anode path and thus also reach the temperature sensors downstream of the stack. Evaporation of this moisture results in a cooling effect (vaporization enthalpy of water is in the relevant range at 41 to 45 KJ/mol), whereby the sensors indicate a drop in temperature. The temperatures at the stack input are thereby above the temperatures at the stack output. In turn, the coolant can be at a higher temperature than the temperatures at the stack outlet, which the temperatures at the stack outlet would also approach, provided that the input conditions do not change or do not change significantly, and provided that little fuel or only pre-tempered fuel is added to the anode circuit. At the beginning of the drying process, the membrane, the gas diffusion layer, the channels or the complete surfaces of the bipolar plates are well supplied with moisture or wetted with water. After progressive drying, the unbound and thus easily transportable water decreases more and more. The gas mass flows in the cathode path and anode path remove fewer and fewer water droplets from the stack and the humidity downstream of the stack decreases. This also reduces the evaporation and, as a result, the temperature gradients at the stack output also decrease. If the gradients at the stack outlet drop below the applicable threshold values or if the output temperatures rise again, then the drying process has been sufficiently carried out. Further drying would dry out the membrane too much, possibly leading to increased degradation, undesirable fuel transport from anode to cathode, unnecessary fuel consumption, an unnecessary time requirement and unnecessary vibrations during shutdown of the system.

Advantageously, when setting the at least one operating parameter, at least one parameter of different functional systems can be set simultaneously, at least partially at the same time, or sequentially. In this way, control of the drying process can be facilitated in a flexible manner.

Preferably, prior to initiating the drying process, at least one preparation step can be performed to, in particular, set or at least bring the at least one operating parameter to a desired level in at least one functional system of the fuel cell system. In this way, constant conditions in the system can be set relatively quickly after the initiation of the drying process and the method can be performed in a time-saving manner.

Furthermore, it is conceivable that different parameter sets of the at least one operating parameter are used when performing the method, and/or that different values of the at least one operating parameter are used when performing the method, in particular sequentially, preferably with a transient transition without evaluation. In this way, the drying process can be carried out in stages, which is gentle on the stack.

As already mentioned above, when monitoring the at least one outlet temperature:

an outlet temperature in a cathode system, and/or an outlet temperature in an anode system of the fuel cell system are sensed. The temperature(s), in particular the starting temperature(s), in the cathode system comprising the cathode path to and/or through the stack, and/or in the anode system comprising the anode path to and/or through the stack, can be indicative of the progress of the drying process to determine an improved termination time of the drying process.

Advantageously, when evaluating the at least one outlet temperature, at least one gradient of a temperature function and/or a temperature difference can be evaluated between at least two points of a temperature function. The gradients that drop and approach zero with the time of the drying process can be indicative of sufficient progress of the drying process, and thus for an appropriate termination time of the drying process. By monitoring the temperature difference, the results of the method can be refined.

Preferably, when evaluating the at least one outlet temperature, at least one threshold value, in particular for the gradient of a temperature function, can be monitored for undershooting. This can be a computationally simple and reliable method for determining sufficient progress of the drying process and thus an appropriate termination time of the drying process.

Furthermore, it can be contemplated that when monitoring the at least one outlet temperature, an outlet temperature in a cathode system and an outlet temperature in an anode system of the fuel cell system (or both outlet temperatures of the reactant paths at the stack output) are sensed, the undershooting of a threshold value at a later time is considered as a termination condition when determining the termination time for ending the drying process, and/or after a threshold value has been undershot for the first time, a predefined waiting time is set which can elapse at most until the drying process is ended in order to wait for a threshold value to be undershot at a later time.

The drying process can thus be carried out variably, providing refined results, and being appropriately ended or ended in a timely manner.

In addition, it is contemplated that when determining the termination time for ending the drying process, a theoretically determined time is used depending on the evaluation, wherein preferably:

the termination time is determined to be the theoretically determined time, or the termination time is determined as the theoretically determined time with a further (or plus a further) compensation time.

In the former case, a quick implementation of the method can be enabled. In the latter case, any uncertainties from the evaluation and/or three-dimensional distribution of the thermodynamic variables in the stack can still be compensated for.

In addition, it is contemplated that after the end of the drying process, at least one further shutdown process will be performed, for example comprising:

a bleed down process and/or a purge process.

In this way, the shutdown process of the fuel cell system can be combined with further advantageous actions in addition to the optimized drying process.

To further refine the method, it can be contemplated that in addition to monitoring and evaluating the at least one outlet temperature, at least one further operating parameter of the fuel cell system is monitored and evaluated, comprising:

an impedance, an electrical voltage of the fuel cell system, and/or an electric voltage of single cells of the fuel cell system.

The method can thus be combined with further triggers or diagnostics or monitoring functions. By combining several criteria, the duration of the drying process can be adapted even more robustly.

Furthermore, it is contemplated that when multiple operating parameters of the fuel cell system are monitored and evaluated, at least two, preferably four, operating parameters are considered when determining the termination time for ending the drying process, or when determining the termination time for ending the drying process, a quality function of the operating parameters is used, which in particular normalizes, weights, and/or combines the values of the operating parameters according to availability.

In the former case, a refined and at the same time relatively fast implementation of the method can be enabled. In the latter case, the method can provide particularly robust and reliable results.

Advantageously, the method, which can proceed as described above, can at least in part, in particular in part, be performed for: evaluation and/or determination, using an external computing unit, in particular a cloud.

The method can further be performed at least in part, comprising initiating, setting, and/or monitoring, by a control unit of the fuel cell system.

A corresponding control unit provides a further aspect of the invention. A computer program can be stored in a memory unit of the control unit in the form of a code, which, when the code is executed by a computing unit of the control unit, carries out a method that can proceed as described above. Using the control unit according to the invention, the same advantages can be achieved as described above in connection with the method according to the invention. In the present case, reference to these advantages is made in full.

The control unit can be in a communication link with temperature sensors at the stack output of the cathode system and/or the anode system to interrogate and/or obtain, for example, the output temperatures. The control unit can control the actuators in the functional systems of the fuel cell system accordingly to perform the method accordingly.

In addition, the control unit can be in a communication link with an external computing unit in order to outsource some method steps and/or calculations, in whole or part, to the external computing unit.

According to a further aspect, the invention provides a computer program product comprising instructions that, when the computer program is executed by a computer, such as e.g. the computing unit of the control unit, causes the computer to perform the method which can proceed as described above. Using the computer program product, the same advantages can be achieved as described above in connection with the method according to the invention and/or the control unit according to the invention. In the present case, reference to these advantages is made in full.

BRIEF DESCRIPTION OF THE DRAWINGS

The invention and its further developments, as well as its advantages, are explained in further detail below with reference to the drawings. The drawings schematically show.

In the various figures, like parts of the invention are always given the same reference numbers, for which reason they are typically only described once.

DETAILED DESCRIPTION

Figure 1:
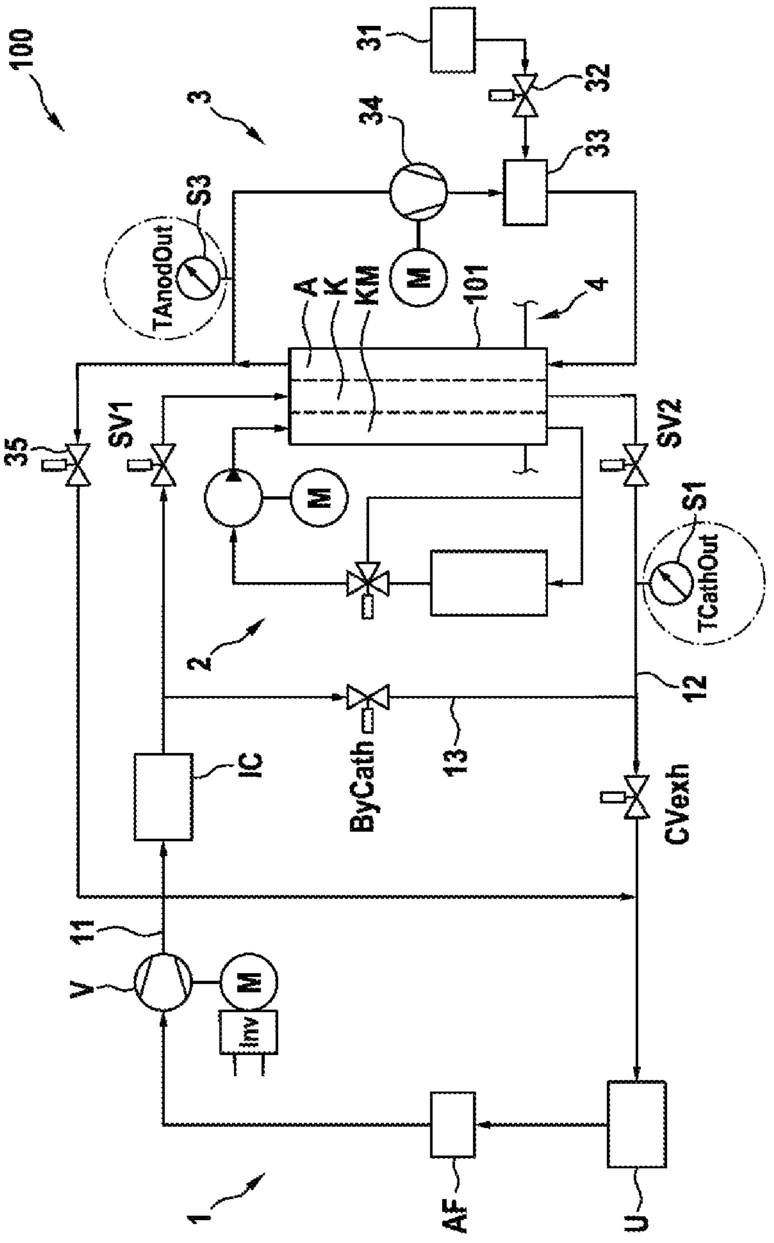
FIG. 1 an exemplary fuel-cell system in the sense of the invention.

FIG. 1 shows an exemplary fuel cell system 100 within the scope of the invention. The fuel-cell system 100 mostly comprises multiple fuel cells assembled into a stack 101. In addition, the fuel cell system 100 comprises at least four functional systems 1, 2, 3, 4, including: a cathode system 1 to supply an oxygen-containing gas mixture to a cathode space or a cathode path K of the stack 101, an anode system 3 to supply a fuel-containing gas mixture to an anode chamber or an anode path A of the stack 101, a cooling system 2 to temperature-control the stack 101, and an electric system 4 to dissipate the generated electrical power from the stack 101.

The fuel cell system 100 comprises a cathode system 1 having a supply line 11 to the stack 101 and an exhaust line 12 from the stack 101. An air filter AF is usually arranged at the inlet of the supply line 11 in order to filter harmful chemical substances and particles or to prevent their entry into the system 100.

The gas conveying machine V in the cathode system 1 can be embodied in the form of a compressor to draw air from the environment U and provide it to the stack 101 in the form of incoming air. After passing through the stack 101, exhaust air from the system 100 is released back to the environment U.

As FIG. 1 indicates, at least one IC supply cooler and possibly a humidifier not shown can be provided downstream of the compressor.

Shut-off valves SV1, SV2 can be provided upstream and downstream of the fuel cell stack or stack 101. In addition, a CVexh valve can be provided as a pressure regulator in the exhaust line 12.

Multiple sensors can also be provided in the supply line 11 and/or in the exhaust line 12, such as e.g. moisture sensors, temperature sensors, pressure sensors, mass and/or volume sensors, etc. All sensors are not shown in FIG. 1 merely for the sake of simplicity.

A bypass line 13 with a bypass valve ByCath can be provided between the supply line 11 and the exhaust line 12. For example, the bypass line 13 can be used for mass flow control in the cathode system 1 and/or for diluting the exhaust air, which can contain hydrogen, from the fuel cell stack or stack 101.

The anode system 3 comprises multiple components. The components used in order to supply fuel include a fuel tank 31 and at least a pressure regulator 32. The pressure regulator 32 can also have a shut-off function. If the pressure regulator 32 does not have a shut-off function, a separate shut-off valve can be provided at the input to the anode space or anode path A.

Further components in the anode system 3 are a jet pump 33 and a recirculation pump 34. In addition, a purge and/or drain valve 35 can be provided in the anode system 3.

Figure 2:
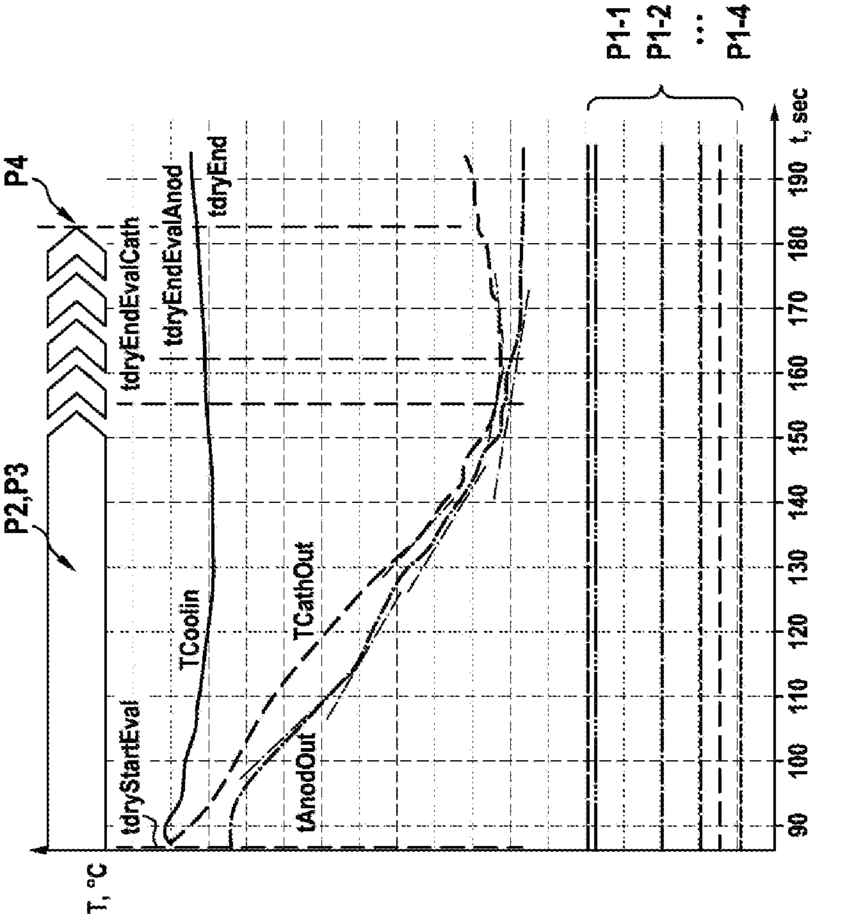
FIG. 2 an exemplary time curve of output temperature(s), in a cathode path of a cathode system and in an anode path of an anode system, as well as an input temperature of a coolant in a coolant path of a fuel cell system for explaining a method according to the invention, and FIG. 3 an exemplary sequence of a method according to the invention.
Figure 3:
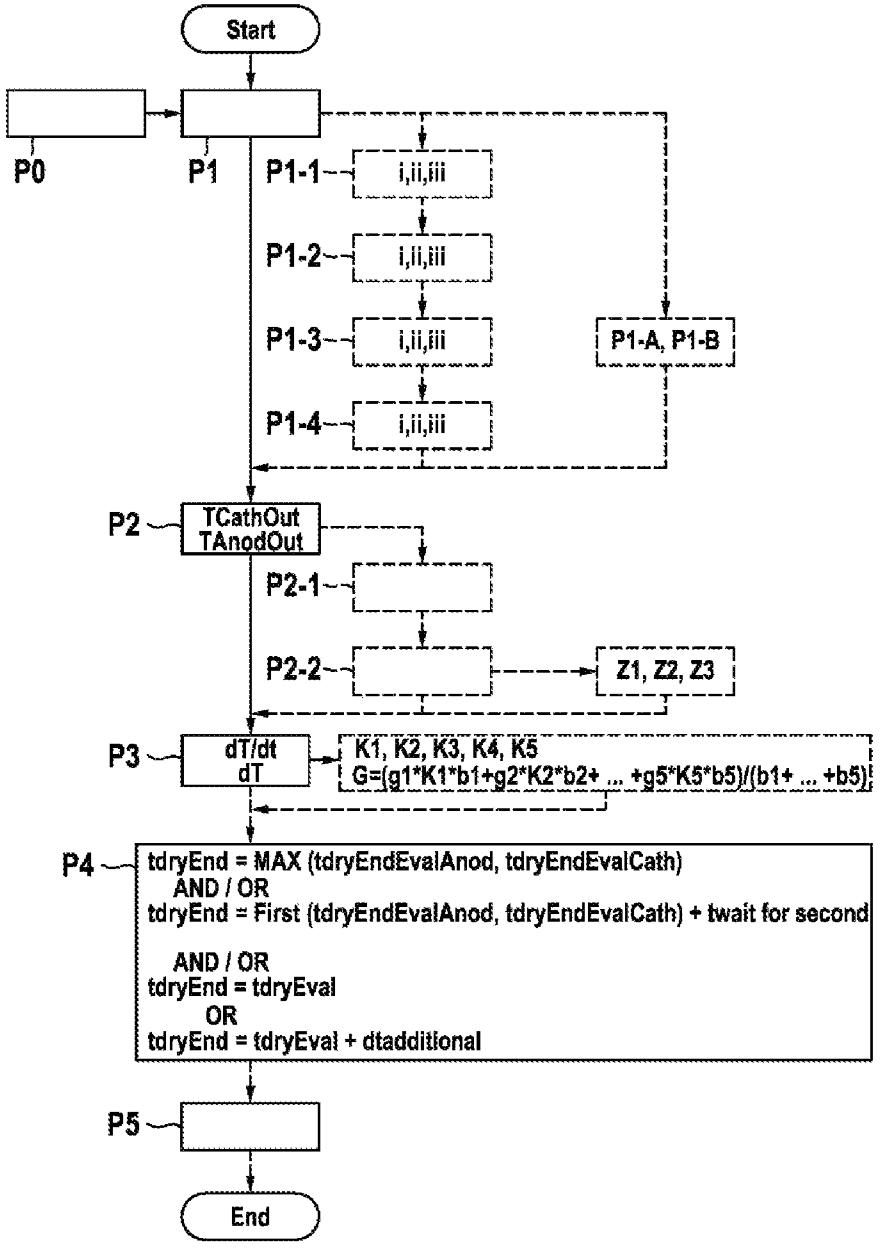

Using FIGS. 2 and 3, a method in the sense of the invention is described, which is used to control a drying process of a fuel cell system 100, in particular during shutdown of the fuel cell system 100, preferably in preparation for a start, in particular a cold start, of the fuel cell system 100, which can e.g. be embodied as shown in FIG. 1.

The method comprises the following steps:

START Initiating a drying process of the fuel cell system 100, or in other words initiating a blowout of a cathode system 1, in particular a cathode path K, and/or an anode system 3, in particular an anode path A, of the fuel cell system 100, P1 setting at least one operating parameter i, ii, iii in at least one functional system 1, 2, 3, 4 of the fuel cell system 100 to a constant level or value, P2 monitoring at least one outlet temperature TCathOut, TAnodOut from the stack 101 in at least one functional system 1, 2, 3, 4 of the fuel cell system 100, in particular in a cathode system 1 and/or in an anode system 3 of the fuel cell system, P3 evaluating the at least one outlet temperature TCathOut, TAnodOut, in particular a first derivative or a gradient of the at least one outlet temperature TCathOut, TAnodOut, P4 determining a termination time tdryEnd for ending the drying process in accordance with the evaluation, and in particular:

END ending the drying process at the determined termination time tdryEnd.

The invention thus enables the optimal control of the drying process of the fuel cell system 100 and, in particular, to end it at an appropriate termination time tdryEnd.

Using the invention, the following advantages can be achieved so that:

the stack 101 is not turned off when too wet, which reduces and almost minimizes the risk of degradation, damage, and/or malfunction of system components, the membrane of the stack 101 does not become too dry, which reduces or even prevents the risk of degradation of the membrane, e.g. by shrinkage and/or thinning of the membrane, fuel diffusion of the anode space A to the cathode space K, fuel concentration increase in the cathode space K and/or unnecessary fuel, the shutdown of the fuel cell system does not take longer than required, i.e., is time-optimized, which results in an optimization of postdrive time and a reduction of undesirable vibrations, so-called NVH, during shutdown of the system.

Advantageously, the duration of the drying process is controlled based on temperature(s) in the anode system 3, in particular at the stack output TAnodOut, and/or temperature (s) in the cathode system 1, in particular at the stack output TCathOut.

As schematically indicated in FIG. 3, the invention can provide in step P1 a setting of constant stack operating conditions in the functional systems 1, 2, 3, 4 of the fuel cell system 100, comprising:

P1-1 an air system or cathode system 1,

P1-2 a cooling system,

P1-3 a fuel system or anode system 3, and/or

P1-4 an electrical system 4.

The method can provide that when setting at least one operating parameter is set i, ii, iii, at least one of the following parameters is set to a constant level or a constant value:

P1-1 at least one operating parameter P1-1i, P1-1ii, P1-1iii in a cathode system 1 of the fuel cell system 100, wherein in particular the at least one operating parameter P1-1i, P1-1ii, P1-1iii in the cathode system 1 comprises at least a mass air flow rate, a pressure level in a cathode path, and/or a cathode inlet temperature, P1-2 at least one operating parameter P1-2i, P1-2ii, P1-2iii in a cooling system 2 of the fuel cell system 100, wherein in particular the at least one operating parameter P1-2i, P1-2ii, P1-2iii in the cooling system 2 comprises at least one temperature of a coolant at a stack inlet and/or a temperature difference of the coolant between a stack inlet and a stack outlet, P1-3 at least one operating parameter P1-3i, P1-3ii, P1-3iii in an anode system 3 of the fuel cell system 100, wherein in particular the at least one operating parameter P1-3i, P1-3ii, P1-3iii in the anode system 3 comprises at least one pressure level in an anode path, and/or P1-4 at least one operating parameter P1-4i, P1-4ii, P1-4iii in an electrical system 4 of the fuel cell system 100, wherein in particular the at least one operating parameter P1-4i, P1-4ii, P1-4iii in the electrical system 4 comprises at least one electrical current and/or a current density.

In this way, conditions as constant as possible can be set on and/or in the stack 101 in order to monitor and evaluate the output temperature(s) TCathOut, TAnodOut in the cathode path K and/or in the anode path A, in particular their derivations dT(t)/dt and/or gradients.

Consequently, the output temperature(s) TCathOut, TAnodOut in the cathode path K and/or in the anode path A, in particular their derivatives dT(t)/dt or gradients, can be indicative factors for the progress of the drying process or for the residual moisture in the system 101.

During the drying process or when blowing out the cathode system 1 and/or anode system 3, moisture or water droplets are discharged from the cathode path K and also from the anode path A and thus also reach the temperature sensors S1, S3 downstream of the stack 101. Evaporation of this moisture results in a cooling effect on the sensors S1, S3, whereby the sensor values indicate a decrease (dT(t)/dt<0) of the temperature T. The temperatures at the stack input are above the temperatures TCathOut, TAnodOut at the stack output. The coolant, in turn, can have a higher temperature TCoolIn than the temperatures TCathOut, TAnodOut at the stack output, as FIG. 2 illustrates. Tendentially, the temperatures TCathOut, TAnodOut at the stack outlet would also approach the temperature TCoolIn of the coolant, provided that the input conditions do not change or do not change significantly and provided that little fuel or only temperature-controlled fuel is added to the anode circuit.

At the beginning of the drying process, the membrane, the gas diffusion layer, the channels or the complete surfaces of the bipolar plates are well supplied with moisture or wetted with water. As the drying process progresses, the unbound and thus easily transportable water decreases more and more. The gas mass flows in the cathode path K and anode path A remove fewer and fewer water droplets from the stack 101 and the humidity downstream of the stack 101 decreases. This also reduces the evaporation and the temperature gradients dTCathOut(t)/dt, dTAnodOut(t)/dt at the stack output also decrease along with this, as FIG. 2 shows.

If the temperature gradients dTCathOut(t)/dt, dTAnodOut (t)/dt at the stack output drop, e.g. below applicable thresholds values tdryEndEvalAnod, tdryEndEvalCath, or if the temperatures TCathOut, TAnodOut rise again, then the drying process has been performed sufficiently.

Further drying would dry out the membrane too much, possibly leading to increased degradation, fuel transport from anode space A to cathode space K, unnecessary fuel consumption, unnecessary time required and unnecessary vibrations during shutdown of the system 100.

The parameters of different functional systems 1, 2, 3, 4 can be set simultaneously, at least partially at the same time, or sequentially.

As further schematically indicated in FIG. 3, prior to initiating the drying process, at least one preparation step P0 can be performed to set the at least one operating parameter i, ii, iii to a desired level in at least one functional system 1, 2, 3, 4 of the fuel cell system 100.

It is further contemplated that different parameter sets P1-A, P1-B of the at least one operating parameter i, ii, iii and different values P1-A, P1-B of the at least one operating parameter i, ii, iii are used when performing the method. In this case, the different values P1-A, P1-B can advantageously be initiated sequentially, preferably with a transient transition, in particular without evaluation. Thus, it can be possible to perform the drying process in stages.

As further indicated schematically in FIG. 3, in step P2 or when monitoring the at least one outlet temperature TCathOut, TAnodOut, an outlet temperature TCathOut in a cathode system 1 and/or an outlet temperature TAnodOut in an anode system 3 of the fuel cell system 100 can be sensed.

As further indicated schematically in FIG. 3, when evaluating the at least one outlet temperature TCathOut, TAnodOut, at least one gradient dT(t)/dt of a temperature function T(t) and/or a temperature difference dT can be evaluated between at least two points of a temperature function T(t).

As indicated in FIG. 2 using legs for the temperature functions, the gradients approach zero with the time of the drying process, which can be a sign of sufficient progress of the drying process and thus an appropriate termination time of the drying process.

As also indicated in FIG. 2, threshold values tdryEndEvalAnod, tdryEndEvalCath, in particular for a gradient dT(t)/dt of a temperature function T(t), can be monitored for undershooting when evaluating the outlet temperatures TCathOut, TAnodOut.

As further shown schematically in FIG. 3, when monitoring the at least one outlet temperature TCathOut, TAnodOut, both outlet temperatures TCathOut, TAnodOut are sensed in the cathode system 1 and in the anode system 3, it can be provided that:

the undershooting of a threshold value tdryEndEvalAnod, tdryEndEvalCath at a later time is considered as a termination condition when determining the termination time tdryEnd for ending the drying process, and/or after a threshold value tdryEndEvalAnod, tdryEndEvalCath has been undershot for the first time, a predefined waiting time twaitforSecond is set, which can elapse at most until the drying process is terminated in order to wait for a threshold value tdryEndEvalAnod, tdryEndEvalCath to be undershot at a later time.

In addition, FIG. 3 schematically shows that when determining the termination time tdryEnd for ending the drying process, a theoretically determined time tdryEndEval can be used in accordance with the evaluation, preferably wherein:

the termination time tdryEnd is determined as the theoretically determined time tdryEndEval, or the termination time tdryEnd is determined as the theoretically determined time tdryEndEval with a further compensation time dtadditional.

In addition, FIG. 3 schematically shows that after the end of the drying process at the termination time tdryEnd, at least one further shutdown process P5 can be carried out, comprising, for example:

a bleed down process and/or a purge process.

In addition, FIG. 3 shows that the method can comprise still further refinement in addition to monitoring and evaluating the at least one outlet temperature TCathOut, TAnodOut, wherein at least one further operating parameter Z1, Z2, Z3 (or criterion K1, K2, K3, K4, K5) of the fuel cell system 100 is monitored in step P2 and evaluated in step P3, comprising:

an impedance Z1, an electrical voltage Z2 of the fuel cell system 100, and/or an electrical voltage Z3 of the single cells of the fuel cell system 100.

When multiple operational parameters TCathOut, TAnodOut, Z1, Z2, Z3 of the fuel cell system 100 are monitored and evaluated, the method can provide that:

at least two, preferably four, operating parameters TCathOut, TAnodOut, Z1, Z2, Z3 are considered when determining the termination time tdryEnd for ending the drying process in step P3, or, as shown schematically in FIG. 3:

when determining the termination time tdryEnd for ending the drying process in step P3, a quality function G of the operating parameters TCathOut, TAnodOut, Z1, Z2, Z3 is used, which in particular normalizes, weights and/or combines the values of the operating parameters TCathOut, TAnodOut, Z1, Z2, Z3 according to availability.

An example of the quality function G can be depicted as follows:

$$G = (g1*K1*b1 + g2*K2*b2 + g3*K3*b3 + g4*K4*b4 + g5*K5*b5)/(b1 + b2 + b3 + b4 - b5).$$

For a quality function G, the criteria K1, K2, K3, K4, K5 (i.e., the operating parameters TCathOut, TAnodOut, Z1, Z2, Z3) can be used as continuous variables or converted as normalized variables (e.g., degree of performance k, %). In addition, the criteria K1, K2, K3, K4, K5 can be weighted (g). Parameter b can stand for a plausible determination (and availability) (b=0 or b=1), so that only the criteria that are available and plausible during the current evaluation are applied. For example, a sensor could freeze and become implausible. In this case, the parameter would be b=0.

If the quality function is G>Glim, the drying process is then ended directly or after another time dtadditional.

The above description of the figures describes the present invention solely in the context of examples. Of course, individual features of the embodiments can be freely combined with one another, insofar as technically sensible, without leaving the scope of the invention.

The invention claimed is:

1. A method for controlling a drying process of a fuel cell system (100) during shutdown of the fuel cell system (100) in preparation for a start of the fuel cell system (100), said method comprising the following steps:

initiating a drying process of the fuel cell system (100), setting at least one operating parameter (i, ii, iii) in at least one functional system (1, 2, 3, 4) of the fuel cell system (100) to a constant level, monitoring at least one outlet temperature (TCathOut, TAnodOut) from a stack (101) of the fuel cell system (100) in at least one functional system (1, 2, 3, 4) of the fuel cell system (100), evaluating the at least one outlet temperature (TCathOut, TAnodOut), determining a termination time (tdryEnd) for ending the drying operation in accordance with the evaluation; and wherein when monitoring the at least one outlet temperature (TCathOut, TAnodOut), an outlet temperature (TCathOut) in a cathode system (1) and an outlet temperature (TAnodOut) in an anode system (3) of the fuel cell system (100) are sensed, an undershooting of a threshold value (tdryEndEvalAnod, tdry EndEvalCath) at a later time is considered as a termination condition when determining the termination time (tdryEnd) for ending the drying process, and/or—after a threshold value (tdry EndEvalAnod, tdry EndEvalCath) has been undershot for the first time, a predefined waiting time (twaitforSecond) is set which can elapse at most until the drying process is terminated in order to wait for a threshold value (tdry EndEvalAnod, tdry EndEvalCath) to be undershot at a later time.

2. The method according to claim 1, wherein when setting at least one operating parameter (i, ii, iii), at least one of the following parameters is set to a constant level:

at least one operating parameter (P1-1i, P1-1*ii*, P1-1iii) in a cathode system (1) of the fuel cell system (100), wherein the at least one operating parameter (P1-1i, P1-1*ii*, P1-1iii) in the cathode system (1) includes at least a mass air flow rate, a pressure level in a cathode path, and/or a cathode inlet temperature, at least one operating parameter (P1-2i, P1-2ii, P1-2iii) in a cooling system (2) of the fuel cell system (100), wherein the at least one operating parameter (P1-2i, P1-2ii, P1-2iii) in the cooling system (2) includes at least one temperature of a coolant at a stack inlet and/or a temperature difference of the coolant between a stack inlet and a stack outlet, at least one operating parameter (P1-3i, P1-3ii, P1-3iii) in an anode system (3) of the fuel cell system (100), wherein the at least one operating parameter ((P1-3i, P1-3ii, P1-3iii) in the anode system (3) includes at least one pressure level in an anode path, and/or at least one operating parameter (P1-4i, P1-4ii, P1-4iii) in an electrical system (4) of the fuel cell system (100), wherein in particular the at least one operating parameter (P1-4i, P1-4ii, P1-4iii) in the electrical system (4) includes at least one electrical current and/or a current density.

3. The method according to claim 1, wherein when setting the at least one operating parameter (i, ii, iii), at least one parameter of different functional systems (1, 2, 3, 4) is set simultaneously, at least partially, at the same time, or sequentially, and/or prior to initiating the drying process, at least one preparation step is performed to set the at least one operating parameter (i, ii, iii) to a desired level in at least one functional system (1, 2, 3, 4) of the fuel cell system (100).

4. The method according to claim 1,
wherein
different parameter sets (P1-A, P1-B) of the at least one operating parameter (i, ii, iii) are used when performing the method ,
and/or that when performing the method, different values (P1-A, P1-B) of the at least one operating parameter (i, ii, iii) are used sequentially with a transient transition without evaluation.

5. The method according to claim 1,
wherein
when monitoring the at least one outlet temperature (TCathOut, TAnodOut), an outlet temperature (TCathOut) in a cathode system (1) and/or an outlet temperature (TAnodOut) in an anode system (3) of the fuel cell system (100) is/are sensed,
and/or that when evaluating the at least one outlet temperature (TCathOut, TAnodOut), at least a first derivation (dT (t)/dt) of a temperature function (T (t))
and/or a temperature difference (dT) is evaluated between at least two points of a temperature function (T (t)),
and/or that when evaluating at least one outlet temperature (TCathOut, TAnodOut), at least one threshold value (tdryEndEvalAnod, tdryEndEvalCath), a gradient (dT (t)/dt) of a temperature function (T (t)), is monitored for undershooting.

6. The method according to claim 1,
wherein
when determining the termination time (tdryEnd) for ending the drying process, a theoretically determined time (tdryEndEval) is used in accordance with the evaluation,
wherein the termination time (tdryEnd) is determined as the theoretically determined time (tdryEndEval),
or the termination time (tdryEnd) is determined as the theoretically determined time (tdryEndEval) with a further compensation time (dtadditional).

7. The method according to claim 1,
wherein
after the end of the drying process, at least one further shutdown process (P5) is performed at the termination time (tdryEnd), comprising:
- a bleed down process and/or
- a purge process.

8. The method according to claim 1,
wherein
in addition to monitoring and evaluating the at least one outlet temperature (TCathOut, TAnodOut), at least one further operating parameter (Z1, Z2, Z3) in an electrical system (4) of the fuel cell system (100), is monitored and evaluated, comprising:
- an impedance (Z1),
- an electrical voltage (Z2) of the fuel cell system (100), and/or
- an electrical voltage (Z3) of the single cells of the fuel cell system (100).

9. The method according to claim 1,
wherein
when multiple operation parameters (TCathOut, TAnodOut, Z1, Z2, Z3) of the fuel cell system (100) are monitored and evaluated,
- at least two operating parameters (TCathOut, TAnodOut, Z1, Z2, Z3) are considered when determining the termination time (tdryEnd) for ending the drying process, or
- when determining the termination time (tdryEnd) for ending the drying process, a quality function (G) of the operating parameters (TCathOut, TAnodOut, Z1, Z2, Z3) is used to standardize, weigh and/or combine the values of the operating parameters (TCathOut, TAnodOut, Z1, Z2, Z3) according to availability.

10. A control unit comprising a memory unit in which a code is stored and a computing unit, wherein, when the code is executed by the computing unit, it carries out the method according to claim 1.

11. A computer program product including commands that, when the computer program product is executed by a computer, prompt the latter to carry out the method according to claim 1.

* * * * *